P. J. O'BRIEN.
WATER CLOSET.
APPLICATION FILED DEC. 1, 1905.
946,861.
Patented Jan. 18, 1910.
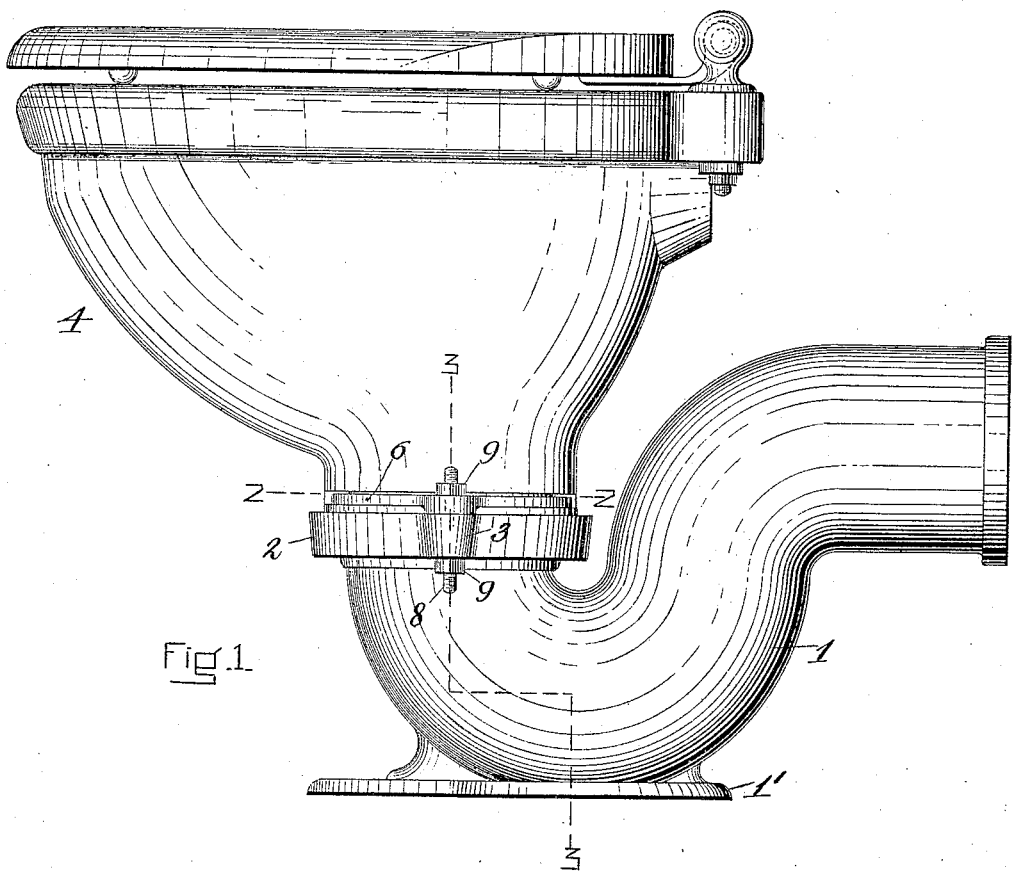
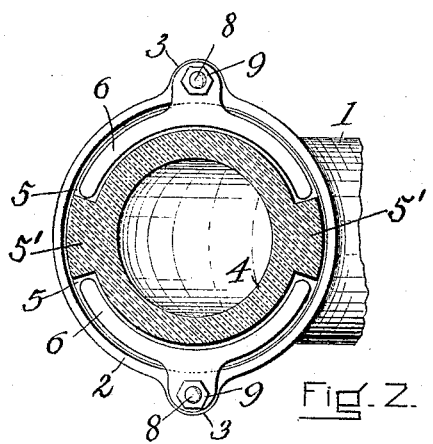
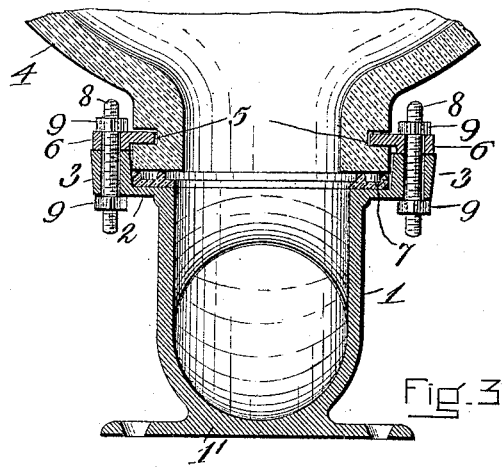
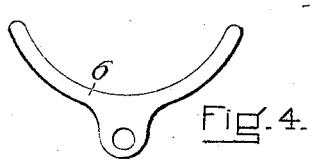
WITNESSES:
E. B. Tomlinson
Patrick J. Conroy
INVENTOR:
Patrick J. O'Brien
by Browne & Woodworth
Attorneys.

UNITED STATES PATENT OFFICE.

PATRICK J. O'BRIEN, OF BOSTON, MASSACHUSETTS, ASSIGNOR TO JAMES BARRETT MANUFACTURING COMPANY, A CORPORATION OF MASSACHUSETTS.

WATER-CLOSET.

946,861.     Specification of Letters Patent.     Patented Jan. 18, 1910.

Application filed December 1, 1905. Serial No. 289,770.

*To all whom it may concern:*

Be it known that I, PATRICK J. O'BRIEN, a citizen of the United States, and resident of Boston, in the county of Suffolk and State of Massachusetts, have invented a new and useful Improvement in Water-Closets, of which the following is a specification.

My invention relates to water-closets of the type known as "short hopper" closets, and it relates more especially to means for securing the hopper to the trap.

The object of my invention is to produce a short hopper water-closet in which a porcelain hopper may be secured to the trap in such a manner that the porcelain lugs heretofore employed for this purpose may be dispensed with so that a firmer and more economical joint may be obtained.

My invention may best be understood by having reference to the drawings which accompany and form a part of this specification, and which illustrate one way in which the foregoing objects may be carried into effect.

In the drawings Figure 1 is a side elevation of a water-closet illustrating one embodiment of my invention. Fig. 2 is a horizontal section taken on the line 2—2 of Fig. 1. Fig. 3 is a vertical section taken on the line 3—3 of Fig. 1. Fig. 4 is a plan view of a detail of construction.

Heretofore it has been the practice to secure the porcelain hopper of a water-closet to the trap by clamping the hopper to the trap by means of bolts extending through porcelain lugs or a porcelain flange formed integral with the hopper and metallic lugs formed integral with the trap.

A joint so formed is more expensive than the one hereinafter described, and also has the disadvantage that considerable strain is put upon the porcelain which is of such a nature as not well to stand said strain. I overcome these defects by obviating the necessity of employing said porcelain lugs, in the following manner.

The hopper 4 is provided at a point near its lower extremity with recesses 5, each extending as shown in Fig. 2, about one-third the way around the circumference of the base of the hopper, and receiving the members 6 made of brass or any other suitable material. The portions 5' 5' of the lower part of the hopper between the ends of the members 6 6 form abutments which prevent the hopper from turning with respect to the trap. The trap 1, which rests upon a base 1', is provided at its upper end with a flange 2, provided with an upwardly extending edge forming a seat for the hopper 4 and carrying the lugs 3. A gasket 7 of any suitable material may be placed on the flange of the trap, upon which gasket the base of the hopper rests as shown in Fig. 3. The members 6 are then inserted in the recesses 5, and by means of the bolts 8 and nuts 9, the members 6, which, as shown, are provided with projecting lugs through which the bolts 8 pass, are firmly secured to the lugs 3 on the flanges of the trap. It will be obvious that by this means the hopper may be tightly clamped to the trap, thereby forming a firm joint and one in which no strain is brought upon any member not adapted to withstand said strain.

I do not wish to limit myself to the exact embodiment of my invention herein disclosed, because it is obvious that many modifications may be made therein by those skilled in the art, without departing from the spirit of my invention.

I claim:

1. In a water-closet, in combination, a trap provided with a flange, a hopper provided near its lower end with circumferentially extending recesses, securing members entering said recesses and provided with projecting lugs, abutments between said members for preventing the hopper from turning with respect to the trap, and means coöperating with said flange and said lugs for securing said hopper to said trap.

2. In a water-closet, in combination, a trap provided with a flange having an upwardly extending edge forming a seat, a hopper provided near its lower end with circumferentially extending recesses and supported in said seat, securing members entering said recesses and provided with trap provided with a flange having an upprojecting lugs, abutments between said members for preventing the hopper from turning with respect to the trap, and means coöperating with said flange and said lugs for securing said hopper to said trap.

In testimony whereof, I have hereunto subscribed my name this 27th day of Nov. 1905.

PATRICK J. O'BRIEN.

Witnesses:
 CHARLES C. KURTZ,
 GEO. K. WOODWORTH.

It is hereby certified that in Letters Patent No. 946,861, granted January 18, 1910, upon the application of Patrick J. O'Brien, of Boston, Massachusetts, for an improvement in "Water-Closets," an error appears in the printed specification, requiring correction as follows: Page 2, line 2, the words and syllable "trap provided with a flange having an up-" should be stricken out; and that the said Letters Patent should be read with this correction therein that the same may conform to the record of the case in the Patent Office.

Signed and sealed this 8th day of February, A. D., 1910.

[SEAL.]

E. B. MOORE,

*Commissioner of Patents.*